US012123815B2

(12) United States Patent
Gomez-Rios et al.

(10) Patent No.: US 12,123,815 B2
(45) Date of Patent: *Oct. 22, 2024

(54) SOLID PHASE MICROEXTRACTION DEVICE, REPOSITORY, AND MANIPULATOR

(71) Applicant: RESTEK CORPORATION, Bellefonte, PA (US)

(72) Inventors: German A. Gomez-Rios, Bellefonte, PA (US); Thomas E. Kane, Bellefonte, PA (US)

(73) Assignee: RESTEK CORPORATION, Bellefonte, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/461,767

(22) Filed: Sep. 6, 2023

(65) Prior Publication Data
US 2023/0408384 A1 Dec. 21, 2023

Related U.S. Application Data

(62) Division of application No. 16/998,619, filed on Aug. 20, 2020, now Pat. No. 11,781,953.
(Continued)

(51) Int. Cl.
G01N 1/40 (2006.01)
B01L 3/02 (2006.01)
B01L 9/00 (2006.01)

(52) U.S. Cl.
CPC ............ *G01N 1/405* (2013.01); *B01L 3/0275* (2013.01); *B01L 9/543* (2013.01);
(Continued)

(58) Field of Classification Search
CPC ......... G01N 1/40; G01N 1/405; H01J 49/165; B01L 2200/0631; B01L 2200/025;
(Continued)

(56) References Cited

U.S. PATENT DOCUMENTS 4,023,716 A 5/1977 Shapiro
4,284,604 A 8/1981 Tervamaki
(Continued)

FOREIGN PATENT DOCUMENTS

TW I291317 B 12/2007

*Primary Examiner* — Maureen Wallenhorst
(74) *Attorney, Agent, or Firm* — McNees Wallace & Nurick LLC

(57) ABSTRACT

A solid phase microextraction device is disclosed, including a substrate having at least one planar surface, a sorbent layer disposed on at least a portion of the at least one planar surface, a tapering tip extending from the substrate, a receptacle mount configured for removable attachment to an emplacement of a receiving device, and a clocking feature configured for fixing a radial orientation of the at least one planar surface with respect to the receiving device. A solid phase microextraction device repository is disclosed including a wall surrounding a chamber, a plurality of orifices disposed in the wall configured to receive and retain the device, and a plurality of clocking feature interfaces disposed in the wall. A solid phase microextraction device manipulator is disclosed, including a manipulator shaft, an
(Continued)

emplacement configured to removably engage a receptacle mount, an electrically conductive contact disposed at the emplacement, an ejector, and a clocking feature interface.

20 Claims, 13 Drawing Sheets

Related U.S. Application Data

(60) Provisional application No. 62/889,271, filed on Aug. 20, 2019.

(52) U.S. Cl.
CPC . *B01L 2200/025* (2013.01); *B01L 2200/0631* (2013.01); *B01L 2300/069* (2013.01); *Y10T 436/255* (2015.01)

(58) Field of Classification Search
CPC .. B01L 9/543; B01L 2300/069; B01L 3/0275; Y10T 436/24; Y10T 436/25; Y10T 436/255; Y10T 436/2575

USPC ....... 422/501, 511, 524, 525, 526, 535, 564; 436/173, 174, 178, 180

See application file for complete search history.

(56) References Cited

U.S. PATENT DOCUMENTS

| | | |
|---|---|---|
| 5,021,217 A | 6/1991 | Oshikubo |
| 5,232,669 A | 8/1993 | Pardinas |
| 5,650,124 A | 7/1997 | Gilson |
| 6,338,825 B1 | 1/2002 | Skeen |
| 7,259,019 B2 | 8/2007 | Pawliszyn et al. |
| 7,421,913 B2 | 9/2008 | Belgardt et al. |
| 7,595,026 B2 | 9/2009 | Hudson et al. |
| 9,346,045 B2 | 5/2016 | Blumentritt et al. |
| 9,733,234 B2 | 8/2017 | Pawliszyn et al. |
| 10,531,821 B2 | 1/2020 | Rudge et al. |
| 10,894,257 B2 | 1/2021 | Welch et al. |
| 11,781,953 B2 * | 10/2023 | Gomez-Rios ......... H01J 49/165 422/501 |
| 2009/0199621 A1 | 8/2009 | Land, III |
| 2017/0023446 A1 | 1/2017 | Rietveld et al. |
| 2019/0232297 A1 | 8/2019 | Daviso et al. |

* cited by examiner

SOLID PHASE MICROEXTRACTION DEVICE, REPOSITORY, AND MANIPULATOR

RELATED APPLICATIONS

This application is a divisional application of U.S. patent application Ser. No. 16/998,619, filed, Aug. 20, 2020, now U.S. Pat. No. 11,781,953, entitled "Solid Phase Microextraction Device, Repository, and Manipulator," which claims the benefit of and priority to U.S. Prov. App. No. 62/889,271, filed Aug. 20, 2019, entitled "Radially Oriented Device for Storing and Dispensing Analyte Collection Devices," which are hereby incorporated by reference in their entirety.

FIELD OF THE INVENTION

This application is directed to solid phase microextraction devices, solid phase microextraction device repositories, and solid phase microextraction device manipulators. In particular, this application is directed to solid phase microextraction devices, solid phase microextraction device repositories, and solid phase microextraction device manipulators including clocking features and clocking feature interfaces.

BACKGROUND OF THE INVENTION

Coated Blade Devices

Coated Blade Spray (CBS) is a solid phase microextraction (SPME)-based analytical technology previously described in the literature (Pawliszyn et al.; U.S. Pat. No. 9,733,234) that facilitates collection of analytes of interest from a sample and the subsequent direct interface to mass spectrometry systems via a substrate spray event (i.e., electrospray ionization).

"Coated blade spray," "CBS blade", and "blade device" are used synonymously herein.

There are two basic stages to CBS-based chemical analysis: (1) analyte collection followed by (2) instrumental analysis. Analyte collection is performed by immersing the sorbent-coated end of the blade device directly into the sample. For liquid samples, the extraction step is generally performed with the sample contained in a vial or well plate.

After analyte collection, the blade device is removed from the sample and, following a series of rinsing steps, the blade device is then presented to the inlet of the mass spectrometer (MS) for analysis. In this fashion, the blade device undergoes several transfer steps. Reliable positioning of the blade device for each of these steps is therefore important, both for manual and robotic automation handling circumstances.

As a direct to MS chemical analysis device, the blade device requires a pre-wetting of the extraction material so as to release the collected analytes and facilitate the electrospray ionization process. Subsequently, a differential potential is applied between the non-coated area of the substrate and the inlet of the MS system, generating an electrospray at the tip of the CBS device. The electric field between the blade and the MS system must be reproducibly created in order to ensure reliable run-to-run precision. Proper positioning of the blade device with respect to the MS skimmer cone opening is therefore very important, including the radial (or rotational) orientation of the blade device.

In general, the blade portion of a blade device has two sides, an upper and a lower. In some cases, different sorbent coatings may be present on each of the flat sides of the blade, and two sample analyses may be therefore performed in sequence; first the analysis of the upper side, followed by a second analysis of the lower. In other examples, same sorbent coating may be present on each of the flat sides of the blade, and a two sample analyses may be therefore performed in sequence, but in different instruments: first the analysis of the upper side on instrument A, followed by a second analysis of the lower on instrument B. In either case, the radial orientation of the blade is also critical.

Previous disclosures describe either manually handling the individual blade devices to properly position them with respect to the entrance to the mass spectrometer. Other examples describe one- and two-dimensional arrays of blade devices in a bulk holder. These embodiments include a rigid support capable of housing more than one blade device. Examples of this arrangement include U.S. Pat. No. 7,259,019. These examples are generally aligned to the standard laboratory sampling plasticware, most commonly microtiter trays having an 8×12 well arrangements, the wells having approximately 9 mm centers. Higher density trays are also commercially available, having smaller sample wells positioned even closer together, in order to maintain the standard sample tray footprint.

Because of the single inlet to the MS device, the sample analysis stage is still a serial process when using these array-based designs. A selected blade device within the greater array is positioned for electrospray ionization. This design has the disadvantage of also positioning the entire array of blade devices in the general proximity of the MS, which creates considerable risk of electrical and/or chemical cross talk between adjacent blade devices during the electrospray ionization processes. This in turn particularly undermines chain-of-custody sample analysis applications, such as clinical or forensic screening of biological fluids.

There is therefore a need for automated handling of CBS devices, where the close position array arrangement is maintained during the sample extraction processes using standard microtiter trays, and where individual blade devices are introduced to the ionization region of the mass spectrometer. The invention disclosed here addresses the additional requirement of radial positioning of the blade during the entire sampling-to-analysis process.

Description of a Micro Pipettor Device

A common tool in laboratories for transporting accurate volumes of liquid is a micropipettor. Examples of this arrangement include U.S. Pat. Nos. 4,284,604, 5,650,124, and 7,421,913. Micropipettors employ a variety of mechanisms to pull liquid volumes into the device and subsequently dispense the liquid. Precision volume capacities for standard pipettors range from 0.1 µL to 10 mL. In order to reduce the risk of sample contamination, disposable pipette tips are employed. The micropipette tips are mounted onto the pipettor by pushing the pipettor into the tip, and friction maintains the tip in place. After the liquid has been dispensed, the tip is ejected off the end of the pipettor, and the entire process is repeated.

In cases where many liquid transfer steps are performed for highly parallel processes, micropipettor devices employing more than one liquid dispensing channel are available. Examples of this arrangement include U.S. Pat. No. 5,021,217. These devices still employ the friction fit attachment mechanism of the disposable tips.

For clarity, the terms "pipette," "pipettor," "micropipettor," and "multichannel pipettor" are used herein synonymously. The terms "pipette tip" and "micropipette tip" are also used synonymously.

Equivalent liquid volumes are drawn and delivered for each tip. Tip position in the pipettor array aligns with the tip positions in storage racks for ease of installation.

Multichannel pipette devices are used with pipette tips in 1- and 2-dimensional array storage racks, so a row of disposable tips can be mounted in parallel into the micropipettor.

Micropipettor technology has also been adapter to robotic systems, where the entire liquid transfer sequence is the same as employed for the manual units but is automated.

Because of the ubiquitous presence of micropipettors in laboratories, both for manual use and integrated into robotic automation setups, maintaining compatibility with the CBS device to the physical dimensions of micropipettor technology is advantageous.

Micropipette Tips

Because many applications that employ micropipettors are sensitive to chemical contamination, disposable, single use pipette tips are available. Standard micropipette tips are loaded onto the pipettor device by centering the device over the docked tip and tapping the device gently onto the opening of the tip. The tip is mounted via friction and is ready for use. Following use, the dirty microtiter tip is removed from the device by means of a tip ejector, typically a slidable sheath around the shaft of the device that engages with the upper lip of the disposable tip and pushes to overcome the friction connection. An example of a pipette tip that has been modified for sample extraction includes U.S. Pat. No. 7,595,026.

Common micropipette tips are conical and do not have a radial orientation requirement for normal operation.

Conductive tips are used to prevent carryover in automated pipetting robots. An example of a conductive tip is the addition of graphite to the raw material polypropylene makes the pipette tips electrically conductive and gives the tips an opaque black appearance. Alternative embodiments where a portion of the pipette tip is conductive are described in U.S. Pat. No. 9,346,045. The relative position of the tips within robotic workstations is identified by measuring electric capacitance. The filling level of the liquid in the tip can be determined in sample and reagent containers by measuring electric currents, so that the depth of immersion of the tip can be adjusted to the filling level.

Because of the frequent tip replacement in standard sampling handling practices, multiple tips are stored in racks where the tips are protected from environmental contamination. In keeping with the array position standards described earlier, bulk storage of disposable tips commonly employs the 8×12, 96 tip arrays or multiples of 96 tips with the standard tip center-to-center position. This allows for direct loading into multichannel pipette devices and maintains the standard rack footprint in laboratories and on the automation workstation platforms.

Rack containers for housing micropipette tips do not include elements to maintain the radial orientations of the standard pipette tips.

BRIEF DESCRIPTION OF THE INVENTION

In one exemplary embodiment, a solid phase microextraction device includes a substrate having at least one planar surface, a sorbent layer disposed on at least a portion of the at least one planar surface, a tapering tip extending from the substrate, a receptacle mount configured for removable attachment to an emplacement of a receiving device, and a clocking feature configured for fixing a radial orientation of the planar surface with respect to the receiving device.

In another exemplary embodiment, a solid phase microextraction device repository includes a repository wall surrounding and defining a chamber, a plurality of orifices disposed in the repository wall, each configured to receive and retain a substrate and a receptacle mount of a solid phase microextraction device, and a plurality of clocking feature interfaces disposed in the repository wall, each configured to guide a clocking feature of the solid phase microextraction device into a predetermined radial orientation and fix the solid phase microextraction device in the predetermined radial orientation. The chamber is configured to accept the substrate of the solid phase microextraction device with the substrate and a tapering tip extending from the substrate being remote from contact with the repository wall or any adjacent solid phase microextraction devices disposed in the solid phase microextraction device repository.

In another exemplary embodiment, a solid phase microextraction device a solid phase microextraction device manipulator includes a manipulator shaft, an emplacement disposed at an end of the shaft, the emplacement being a pipettor tip emplacement configured to removably engage a pipette tip receptacle mount of a solid phase microextraction device, an electrically conductive contact disposed at the emplacement such that when the pipette tip receptacle mount of the solid phase microextraction device is mounted to the emplacement, the electrically conductive contact is in electrical communication with an electrically conductive terminal of the pipette tip receptacle mount, an ejector configured to dismount the pipette tip receptacle mount from the emplacement, and a clocking feature interface configured to guide a clocking feature of the solid phase microextraction device into a predetermined radial orientation and fix the solid phase microextraction device in the predetermined radial orientation.

BRIEF DESCRIPTION OF THE DRAWINGS

Wherever possible, the same reference numbers will be used throughout the drawings to represent the same parts.

DETAILED DESCRIPTION OF THE INVENTION

To date, no microscale sampling device has been adapted to the mechanical elements of micropipette devices for loading and ejecting disposable tips, with the additional requirement of radial positioning.

Because CBS blades are nominally flat strips which require a specific radial orientation when loaded into the source of the analyzer (in most cases, a mass spectrometer), control of the radial orientation of the blade during all stages of use is desired. Disclosed are several examples where the radial orientation of the blade device is maintained throughout the sampling and analysis work flow. Examples are presented where the blade device orientation is maintained while the blades devices are stored in bulk. Also presented are examples where the blade devices may be interfaced with standard micropipette mechanical devices while maintaining the radial orientation.

A further requirement of CBS blades is the application of a voltage bias onto the blade during spray analysis. It is desirable that the modified CBS blade also contains elements that permit the application of a voltage bias onto the blade as part of the device. Embodiments of the invention described herein include the blade having a voltage bias applied during spray analysis. Examples of the invention are disclosed depicting electrode elements as well as the use of electrically conductive tips to apply the voltage required during sample analysis.

Disclosed herein is a solution to control the radial orientation of a solid phase microextraction device during the entire analytical workflow. The solution is mechanically compatible with both manual and automation laboratory applications. This solution conforms to the mechanical standards common in analytical laboratory systems, including by direct integration with installed laboratory devices such as pipettors and bulk storage devices to promote rapid adoption of the solid phase microextraction devices disclosed herein by laboratories.

As used herein, "about" indicates a variance of 15% of the value being modified by "about," unless otherwise indicated to the contrary.

As used herein, "solid phase microextraction" includes, but is not limited to, a solid substrate coated with a polymeric sorbent coating, wherein the coating may include metallic particles, silica-based particles, metal-polymeric particles, polymeric particles, or combinations thereof which are physically or chemically attached to the substrate. In some non-limiting examples, the solid substrate has at least one depression disposed in or protrusion disposed on a surface of the substrate and said substrate includes at least one polymeric sorbent coating disposed in or on the at least one depression or protrusion. The term "solid phase microextraction" further includes a solid substrate with at least one indentation or protrusion that contains at least one magnetic component for the collection of magnetic particles or magnetic molecules onto the solid substrate.

Figure 1:
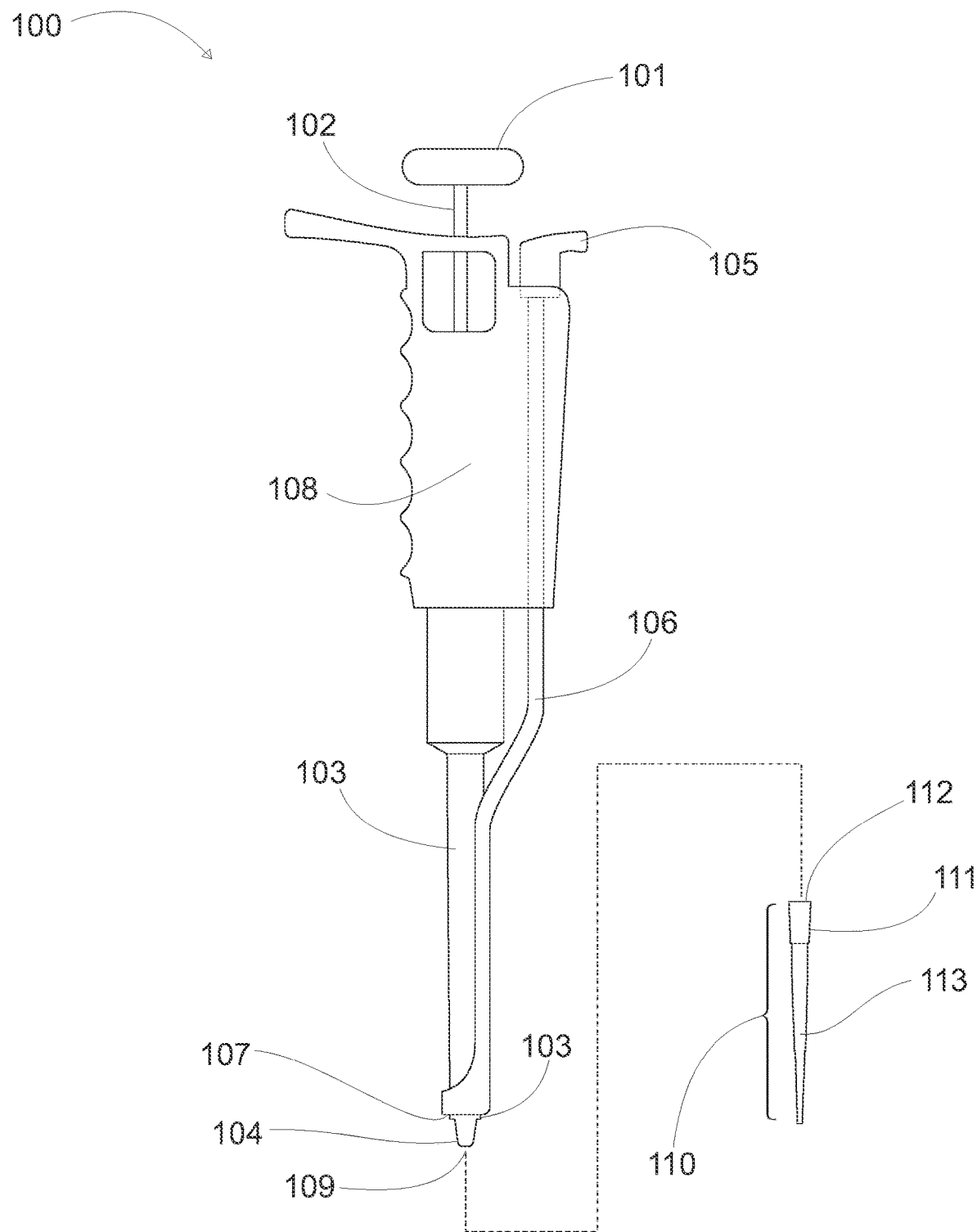
FIG. 1 illustrates the relevant mechanical elements of a commercially available micropipettor and disposable pipette tip.

FIG. 1 illustrates a common commercially available manual micropipettor 100. The pipettor is a plunger displacement-based device capable of first drawing liquid into the pipette tip 110 and subsequently dispensing the liquid. The plunger mechanism is not shown and resides in the housing 108 of the pipettor between the plunger shaft 102 and the pipette end 109.

Standard micropipette tips are loaded onto the pipettor device 100 by centering the device over the tip 110 (commonly docked in a separate holder, not shown) and tapping the device 100 gently onto the opening of the tip 112. The tip 100 is mounted via friction against the conical outer surface 104 of the pipette end 109 and is ready for use.

The operator first depresses the push button 101 and immerses the pipette tip 110 into the liquid of interest. Releasing the push button draws a volume of liquid into the vessel portion 113 of the pipette tip. The liquid is transferred by depressing the push button 101 again, and the liquid is dispensed.

Following the desired number of liquid transfer operations, the pipette tip 110 is ejected from the pipettor by depressing the tip ejector button 105. This operation pushes the tip ejector 106 down the length of pipette shaft 103 and the bottom surface of the ejector shaft 107 pushes the pipette tip 110 off the conical outer surface 104 of pipettor end 109. The entire procedure is then repeated as required.

While the manual version of the pipette device is shown, automated and robotic versions include the same relevant mechanical elements.

The conical shape and dimensions of the pipette end 109, the bottom surface of the ejector shaft 107, and the pipette tip cup 111 are standardized in the art. In one embodiment, the solid phase microextraction devices disclosed herein are adapted to these standardized dimensions in order to interface easily with the installed laboratory equipment.

Figure 2A:
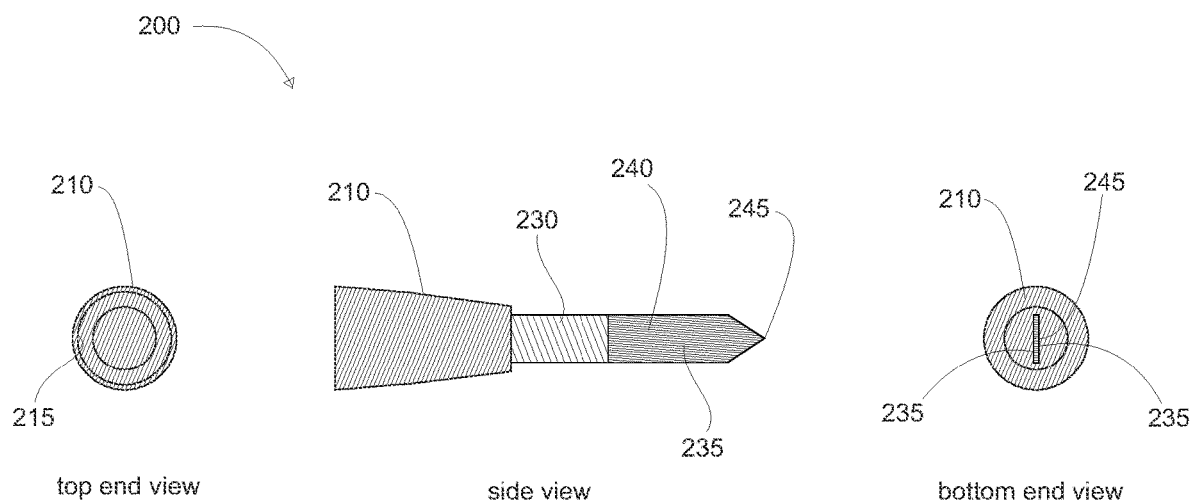
FIGS. 2(a) and (b) illustrate a solid phase microextraction device integrated with the connection elements to interface with a commercially available micropipettor, according to an embodiment of the present disclosure.
Figure 2B:
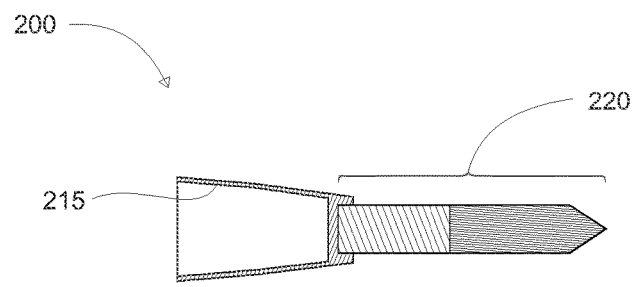

Referring to FIGS. 2(a) and (b) the basic elements of a solid phase microextraction device 200 comprise a substrate 230 having at least one planar surface 235, a sorbent layer 240 disposed on at least a portion of the at least one planar surface 235, a tapering tip 245 extending from the substrate 230 toward an analysis end of the solid phase microextraction device 200, and a receptacle mount 210 configured for removable attachment to an emplacement 104 of a receiving device 100. The substrate 230 may have any suitable dimensions, including, but not limited to, about 4 mm wide×about 40 mm long×about 0.5 mm thick. The substrate 230 may be made from any suitable material, including, but not limited to, conductive materials such as, but not limited to, stainless steels. The sorbent layer 240 may include an extraction phase sorbent including, but not limited to, polymeric particles (e.g., silica modified with $C_{18}$ groups) and a binder (e.g., polyacrylonitrile).

In one embodiment, the solid phase microextraction device 200 is a CBS device that has been adapted to standard pipette tip 110 dimensions. The blade portion 220 is fitted with a cup as the receptacle mount 210 which is configured to attach to the emplacement 104 on the pipettor end 109. The receptacle mount 210 is fixed to the substrate 230 and is positioned at the opposite end from the sorbent layer 240 and tapering tip 245. The inner surface 215 of the receptacle mount 210 is shaped to employ a friction fit mechanism, consistent with the standard commercial pipette tip cup 111. The receptacle mount 210 may be made from electrically insulating polymers consistent with standard pipette tips, such as, but not limited to, polypropylene or electrically conductive polymers such as, but not limited to, carbon impregnated polypropylene.

Figure 3A:
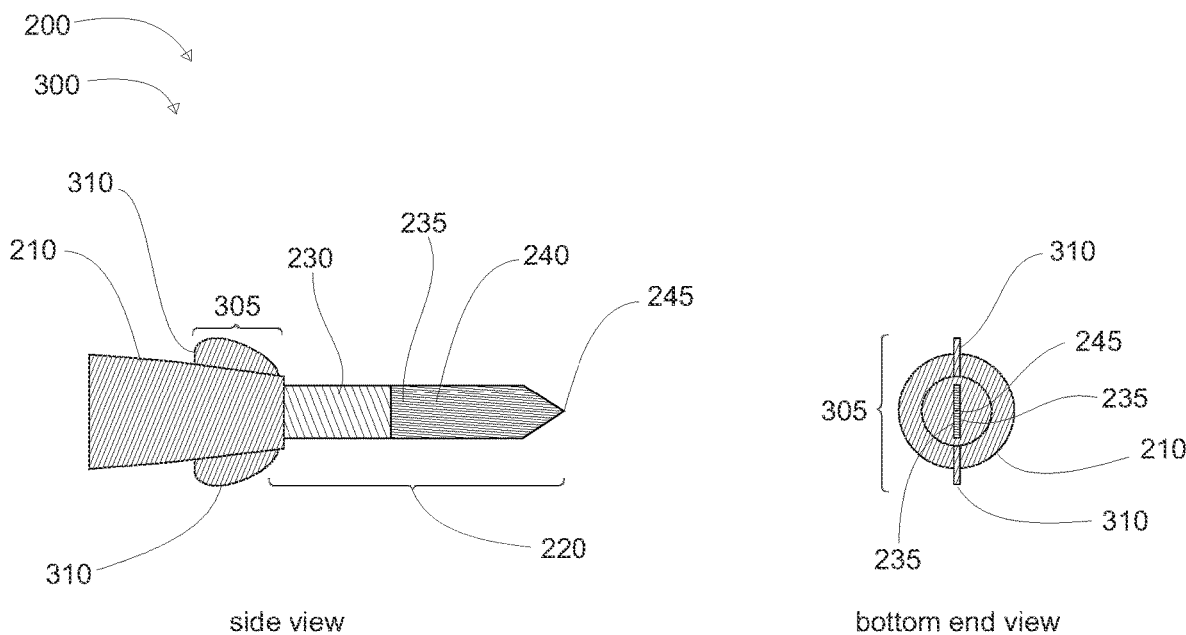
FIGS. 3(a) and (b) illustrate a solid phase microextraction device having fin elements for control of radial orientation while housed in a storage container, according to an embodiment of the present disclosure.
Figure 3B:
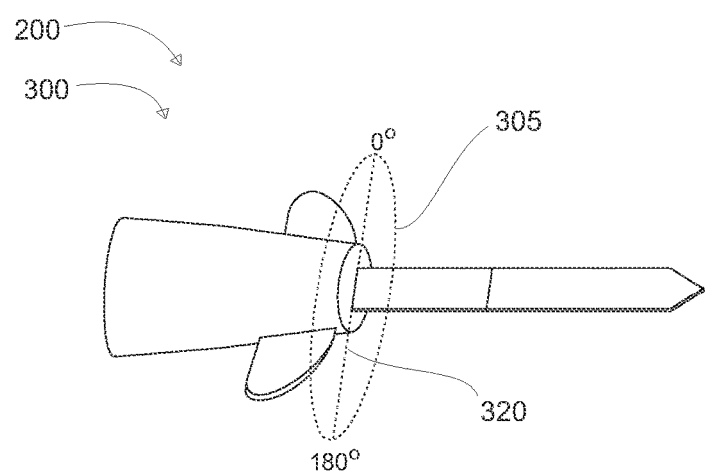

Referring to FIGS. 3(a) and (b), in one embodiment, the solid phase microextraction device 200 includes a clocking feature 305, which is configured to fix a radial orientation of the planar surface 230 with respect to the receiving device 100. "Clocking" is intended to connotate the passage of a hand around an analogue clockface as a paradigm for indicating radial orientation of the planar surface 230. In one embodiment, the clocking feature 305 includes at least one of an indentation or a protrusion corresponding to at least one of a complimentary protrusion or complimentary indentation of the receiving device 100, such that when the solid phase microextraction device 200 is mounted to the receiving device 100, the clocking feature 305 limits the radial orientation of the solid phase microextraction device 200 with respect to the receiving device 100 to a predetermined number of radial positions. The predetermined number of radial positions may consist of a single radial position, two radial positions, or may include any suitable lager number of radial positions. The solid phase microextraction device 200 may include visual indicia of the radial orientation of the at least one planar surface 230 on the receptacle mount 210. Such visual indicia may serve to indicate the radial orientation of the at least one planar surface 230 when the planar surface 230 itself is not visible.

In one embodiment, the solid phase microextraction device 200 is a pipettor-compatible CBS device 300, the receptacle mount 210 is a pipette-tip receptacle mount 210, and the emplacement 104 is a pipettor tip emplacement 104 configured to removably engage the pipette tip receptable mount 210. As used herein, "removably" indicates removal without damage to the pipettor tip emplacement 104 or the pipette-tip receptacle mount 210. The receiving device 100 may be any suitable device, including, but not limited to, a pipettor 100 or a solid phase microextraction device manipulator 700 (described below).

In a further embodiment, the pipette-tip receptacle mount 210 has two fin protrusions 310 extending equidistant from the pipette tip receptacle mount 210 serving as the clocking feature 305. The presence of the two fin protrusions 310 in this configuration reduces the radial position conditions 320 of the blade to two discreet equivalent positions (i.e., 0° and 180°). The two-fin design depicted here is for illustration purposes; other configurations employing greater or fewer fins may be used, or other features on the pipette tip receptacle mount 210 may be conceived where the radial rotation of the solid phase microextraction device 200 is restricted when engaged with an emplacement 104. In order for the fin protrusions 310 to control radial position they engage with the receiving device 100 in a lock-and-key arrangement.

Figure 4:
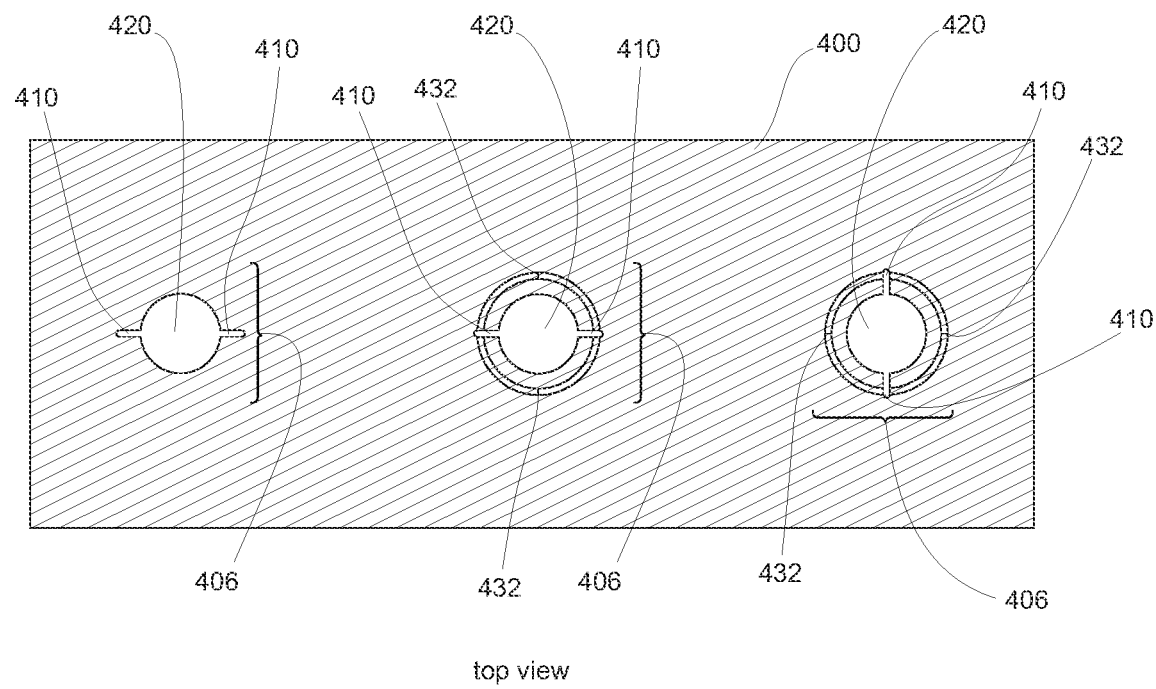
FIG. 4 illustrates a solid phase microextraction device repository with three examples of mechanical elements to promote control of the radial orientation of a solid phase microextraction device having fin elements, according to an embodiment of the present disclosure.
Figure 4:
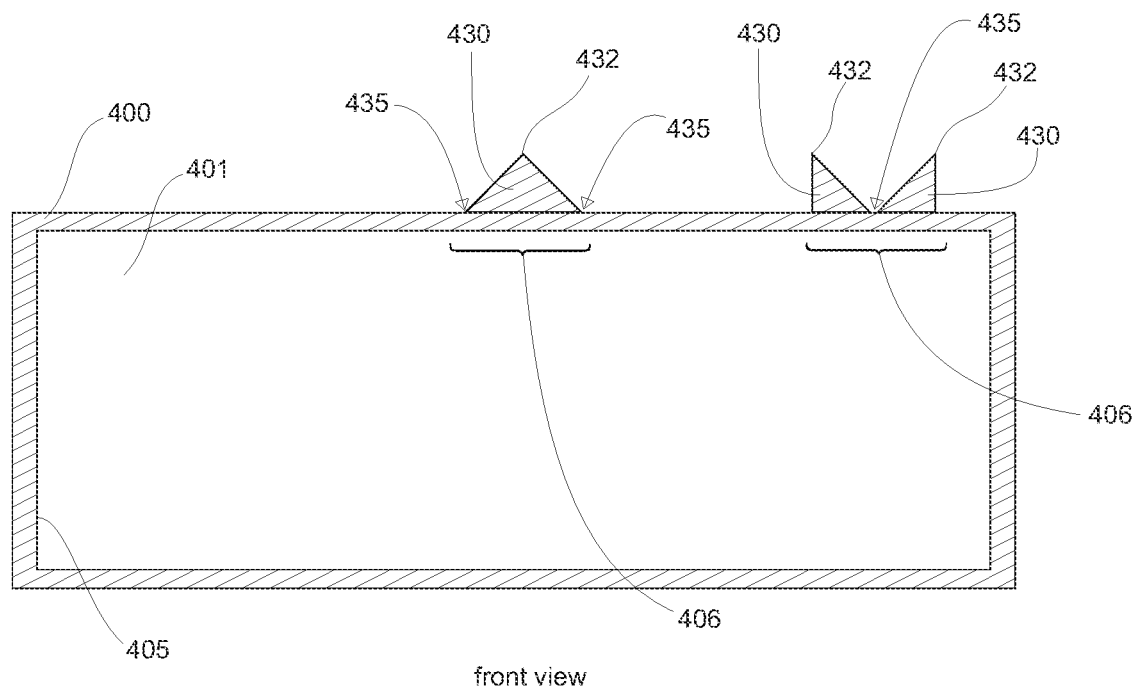
Figure 5:
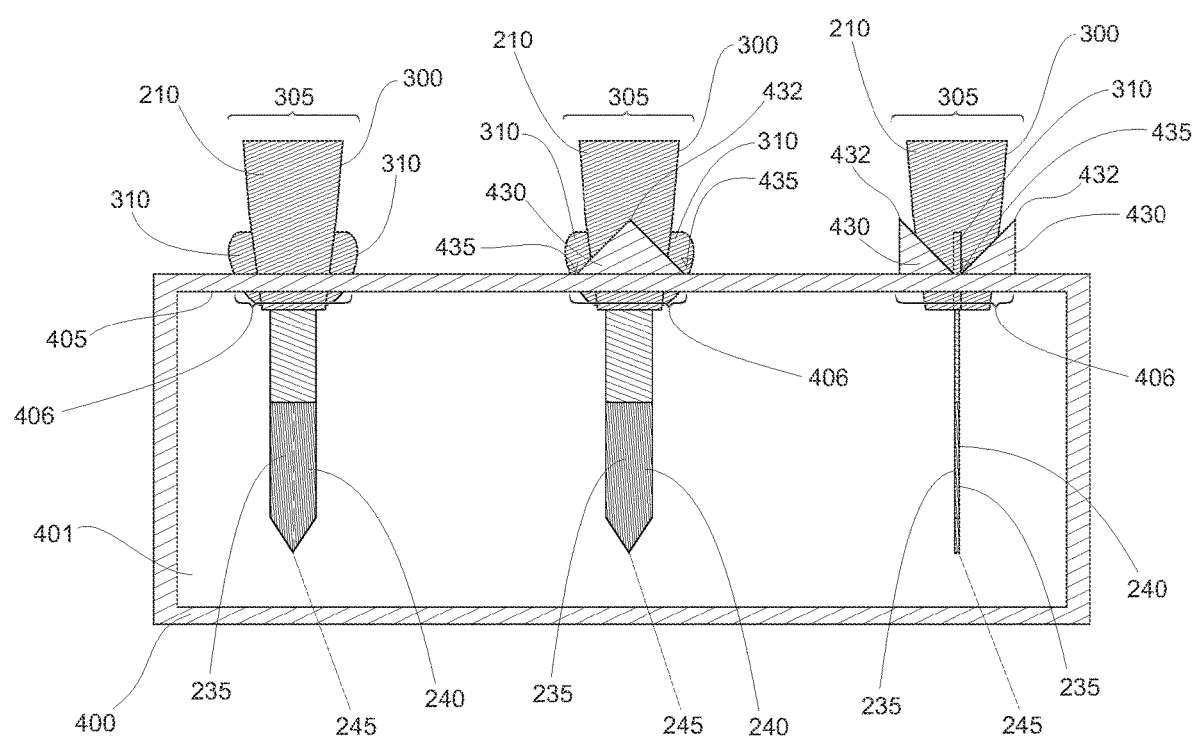
FIG. 5 illustrates three examples of the solid phase microextraction device repository with properly docked solid phase microextraction devices having fin elements, according to an embodiment of the present disclosure.

FIGS. 4 and 5 illustrates a solid phase microextraction device repository 400 which orients the solid phase microextraction device 300 while it is docked. The solid phase microextraction device repository 400 includes a repository wall 405 surrounding and defining a chamber 401, a plurality of orifices 420 disposed in the repository wall 405, each configured to receive and retain a substrate 230 and a receptacle mount 210 of a solid phase microextraction device 200, and a plurality of clocking feature interfaces 406 disposed in the repository wall 405, each configured to guide a clocking feature 305 of the solid phase microextraction device 200 into a predetermined radial orientation and fix the solid phase microextraction device 200 in the predetermined radial orientation. The chamber 401 is configured to accept the substrate 230 of the solid phase microextraction device 200 with the substrate 230 and a tapering tip 245 extending from the substrate 230 being remote from contact with the repository wall 405 or any adjacent solid phase microextraction devices 200 disposed in the solid phase microextraction device repository 400. The plurality of orifices 420 may be arranged in any suitable pattern or without pattern, including, but not limited to, a one-dimensional array or a two-dimensional array. The radial orientations of the individual solid phase microextraction devices 300 docked in the solid phase microextraction device repository may all be the same or different as required by the sample handling and analysis operations.

In one embodiment, the solid phase microextraction device repository 400 includes two slits 410 as the clocking feature interfaces 406, radially positioned consistent with clocking feature 310 of the solid phase microextraction device 300. In a further embodiment, the taper of the blade fins 310 provides an additional mechanism to assist the successful docking of slightly offset solid phase microextraction devices 300 with respect to the axial center of the tapering tip 245 and the orifices 420 of the solid phase microextraction device repository 400. The blade fins 310 and the corresponding clocking feature interfaces 406 may include asymmetrical configurations so as to further limit the positioning of the solid phase microextraction device 300 to a single position while engaged with the solid phase microextraction device repository 400.

In one embodiment, the clocking feature interface 406 includes guidance protrusions 430 surrounding the orifice 420 to promote proper alignment of solid phase microextraction devices 300 when they are docked into the solid phase microextraction device repository 400. If the solid phase microextraction device 300 is radially off axis with respect to the orientation of the clocking feature 310 to the clocking feature interface 406, the guidance protrusions 430 are tapered to a point 432 and join to create a valley shape 435 at the base of the orifice 420. The taper of the guidance protrusions 430 provides a mechanism to guide and realign an off-axis solid phase microextraction device 300 so that it is properly positioned while docked in the solid phase microextraction device repository 400.

The orientation of the solid phase microextraction device 300 in the solid phase microextraction device repository 400 may be configured to remain consistent with the positioning requirements of either a manual operator or automated usage. FIG. 5 illustrates three possible, but not exclusive, arrangements of the solid phase microextraction device 300 docked in solid phase microextraction device repository 400. The chamber 401 of the solid phase microextraction device repository 400 may be configured so as to ensure that individual solid phase microextraction devices 300 are not in contact with the repository wall 405 or each other. Additional wall or barrier structures (not shown) may also be employed in the solid phase microextraction device repository 400 to ensure solid phase microextraction device integrity.

Figure 6:
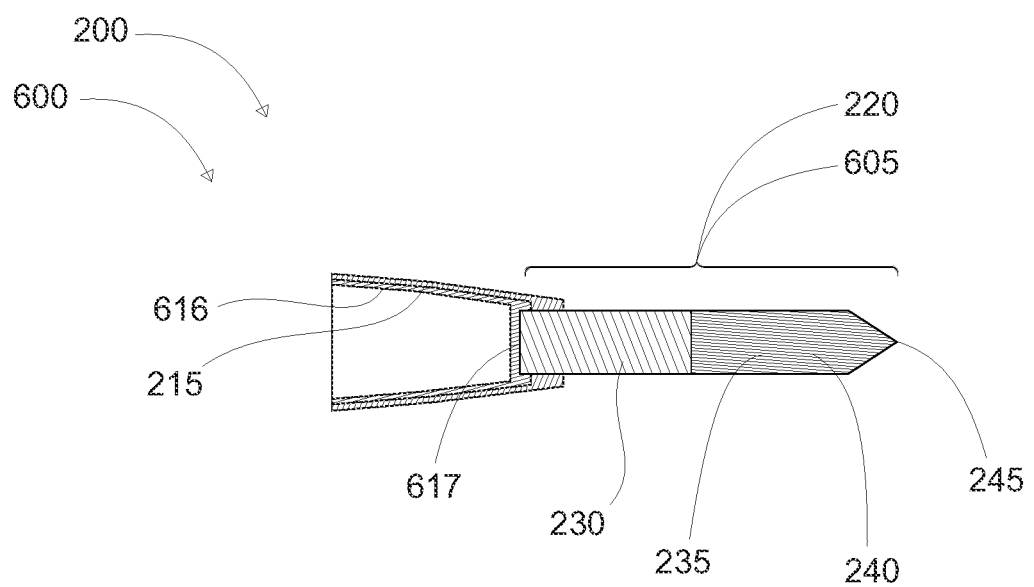
FIG. 6 illustrates a solid phase microextraction device having micropipettor connection elements with an integrated electrode surface inside the connection element for the application of a voltage to the solid phase microextraction device, according to an embodiment of the present disclosure.

Referring to FIG. 6, in one embodiment, an electrically conductive solid phase microextraction device 600 includes a substrate 230 having an electrically conductive portion 605. The receptacle mount 210 includes an electrically conductive terminal 616 disposed on an inner surface 215 of the receptacle mount 210 configured to be in electrical communication with the emplacement 104 of the receiving device 100 when the electrically conductive solid phase microextraction device 600 is mounted to the receiving device 100. At least a portion of the receptacle mount 210 may include an electrically conductive layer 617 (or the receptacle mount 210 may include an electrode) in electrical communication with the electrically conductive portion 605 of the substrate 230 and the electrically conductive terminal 616 of the receptacle mount 210.

The electrically conductive terminal 616 may cover all or part of the inner surface 215 of the receptacle mount 210. In one embodiment, the presence of the electrically conductive terminal 616 does not interfere with the friction fit mechanism used to attach the electrically conductive solid phase microextraction device 600 to the emplacement 104, or the use of the ejector shaft 107 to remove the electrically conductive solid phase microextraction device 600 from the receiving device 100 after use.

In one embodiment, the receptacle mount is composed of an electrically conductive polymer, is in electrical communication with the electrically conductive portion 605 of the substrate 230, and is configured to be in electrical communication with the emplacement 104 of the receiving device 100 when the electrically conductive solid phase microextraction device 600 is mounted to the receiving device 100.

Figure 7:
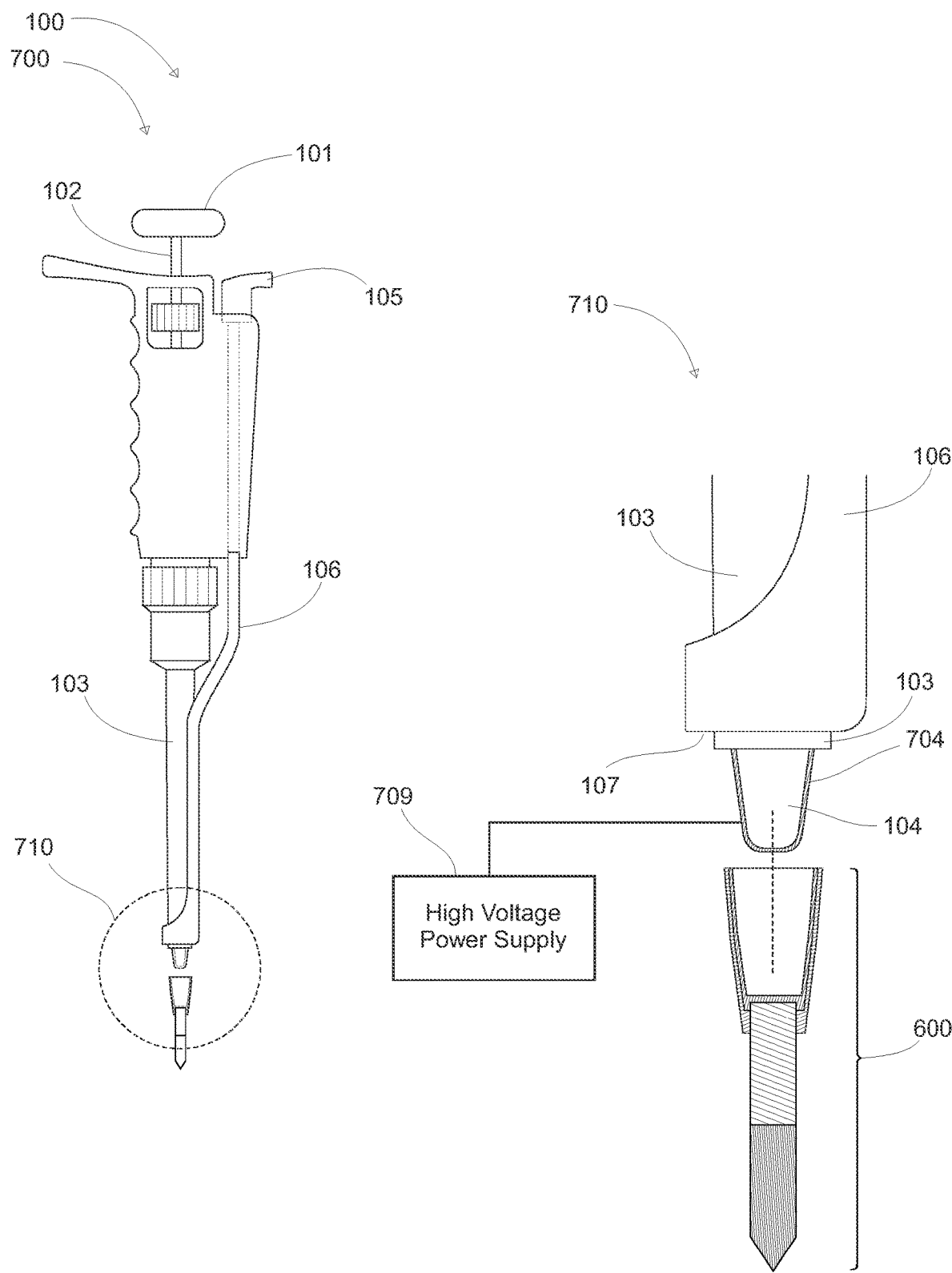
FIG. 7 illustrates a micropipettor modified to provide electrical communication with a solid phase microextraction device having an integrated electrode, according to an embodiment of the present disclosure.

Referring to FIG. 7, in one embodiment, a solid phase microextraction device manipulator 700 (also shown in magnified detail 710) includes a manipulator shaft 103, an emplacement 104 disposed at an end of the manipulator shaft 103, the emplacement 104 being a pipettor tip emplacement 104 configured to removably engage a pipette tip receptacle mount 210 of a solid phase microextraction device 200. An electrically conductive contact 704 is disposed at the emplacement 104 such that when the pipette tip receptacle mount 210 of the solid phase microextraction device 200 is mounted to the emplacement 104, the electrically conductive contact 704 is in electrical communication with an electrically conductive terminal 616 of the pipette tip receptacle mount 210. An ejector 106 is configured to dismount the pipette tip receptacle mount 210 from the emplacement 104, and a clocking feature interface 406 is configured to guide a clocking feature 305 of the solid phase microextraction device 200 into a predetermined radial orientation and fix the solid phase microextraction device 200 in the predetermined radial orientation. The ejector 106 may be an ejector shaft 106. The ejector 106 may be composed in whole or in part of an electrically insulating material. Electrically insulating materials may be incorporated in various portions of the solid phase microextraction device manipulator 700 as needed to isolate the flow of electricity to necessary pathways.

In one embodiment, the electrically conductive contact 704 is a conductive layer applied to the outer surface of the pipettor tip emplacement 104.

In one embodiment, the electrical circuit incorporated in the solid phase microextraction device manipulator 700 provides the electrically conductive solid phase microextraction device 600 with voltage during sample analysis, and includes a high voltage power supply 709 wired to the electrically conductive contact 704 of the solid phase microextraction device manipulator 700. When the electrically conductive solid phase microextraction device 600 is engaged with the pipettor tip emplacement 104, electrification of the blade portion 220 is enabled. Preferably, the presence of the electrically conductive contact 704 does not interfere with the friction fit mechanism used to attach the electrically conductive solid phase microextraction device 600 to the pipettor tip emplacement 104, or the use of the ejector shaft 106 to remove the electrically conductive solid phase microextraction device 600 from the receiving device 100 after use.

While the solid phase microextraction device manipulator 700 has been modified to enable electrification of the electrically conductive solid phase microextraction device 600, in one embodiment, all of the liquid handling functions of the standard pipettor are maintained. This enables the use of a single hand tool or automation accessory to individually perform either basic liquid handling with standard pipette tips or CBS-related tasks. Hence, the ejector shaft 106 on the solid phase microextraction device manipulator 700 may be compatible with conductive tips and may be made of one or multiple layers of electrically insulating materials.

Simpler solid phase microextraction device manipulators 700 are also included which eliminate all of the liquid handling elements of the standard pipettor, while maintaining the elements necessary to mount, electrify, and eject an electrically conductive solid phase microextraction device 600. These solid phase microextraction device manipulator 700 embodiments consist of a basic pipette shaft 106 with a pipettor end 109 having the standardized emplacement 104, the ejector shaft 107, and the electrically conductive contact 704. Manual use versions and robotic use versions of the simplified solid phase microextraction device manipulators 700 may be adapted.

Figure 8:
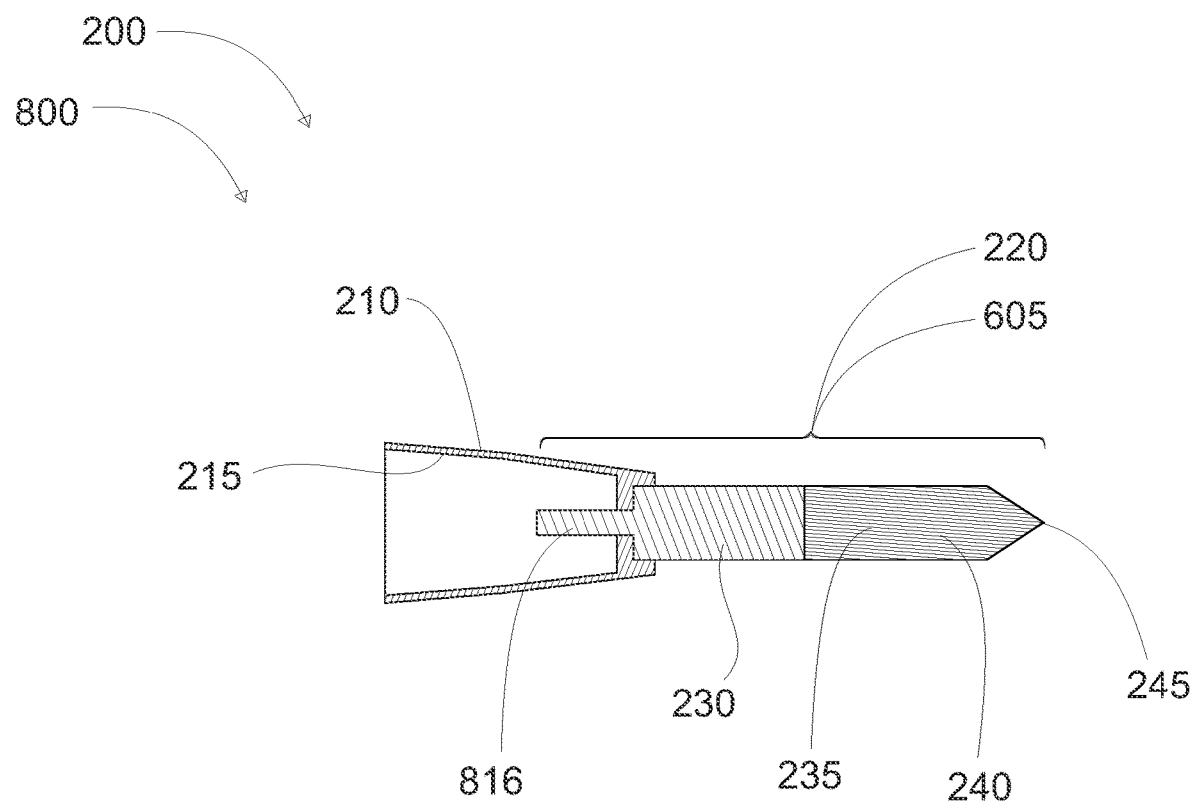
FIG. 8 illustrates a solid phase microextraction device having micropipettor connection elements with an integrated electrode resident inside the connection element for the application of a voltage to the blade device, according to an embodiment of the present disclosure.

Referring to FIG. 8, in one embodiment, the solid phase microextraction device 200 includes a discreet electrode 816, connected to the substrate 230 and located within the receptacle mount 210, and the solid phase microextraction device manipulator 700 includes the electrically conductive contact 704, electrically connected to the high voltage power supply.

Figure 9:
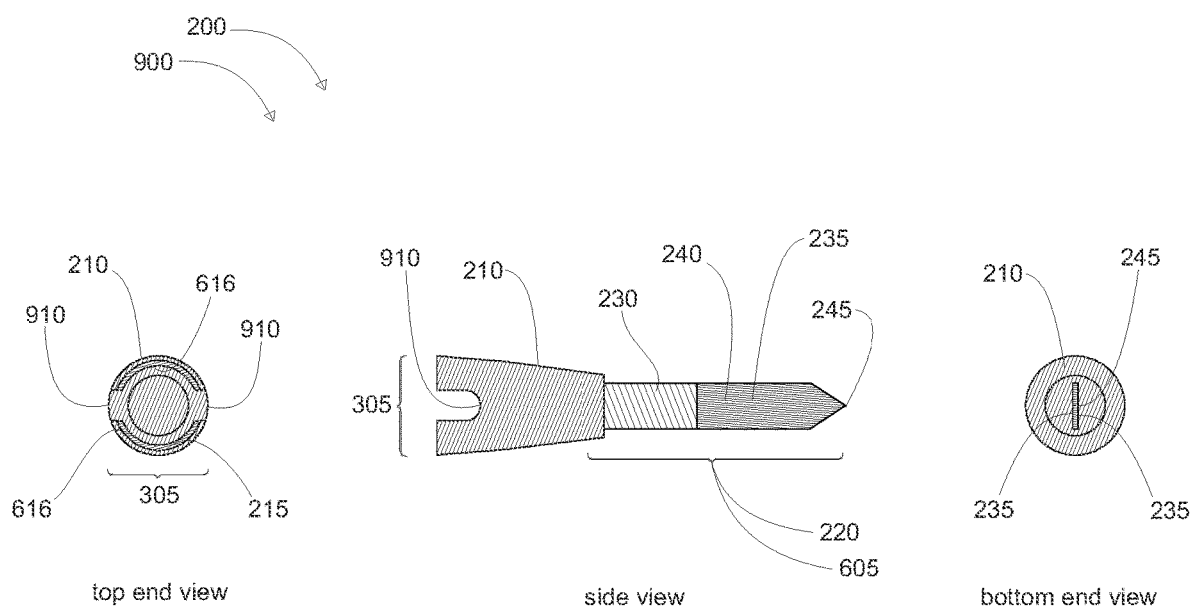
FIG. 9 illustrates a solid phase microextraction device having micropipettor connection elements with two slots positioned around the connection element to control of the radial orientation of a solid phase microextraction device to one of two positions, according to an embodiment of the present disclosure.

Referring to FIG. 9, in one embodiment the clocking feature 305 includes slots 910 provide equidistant along the outer rim of the receptacle mount 210. A conductive layer 616 is attached to the inner surface 215 of the receptacle mount 210. In cases where a conductive polymer is employed for the receptacle mount 210, the conductive layer 616 may be eliminated.

Figure 10:
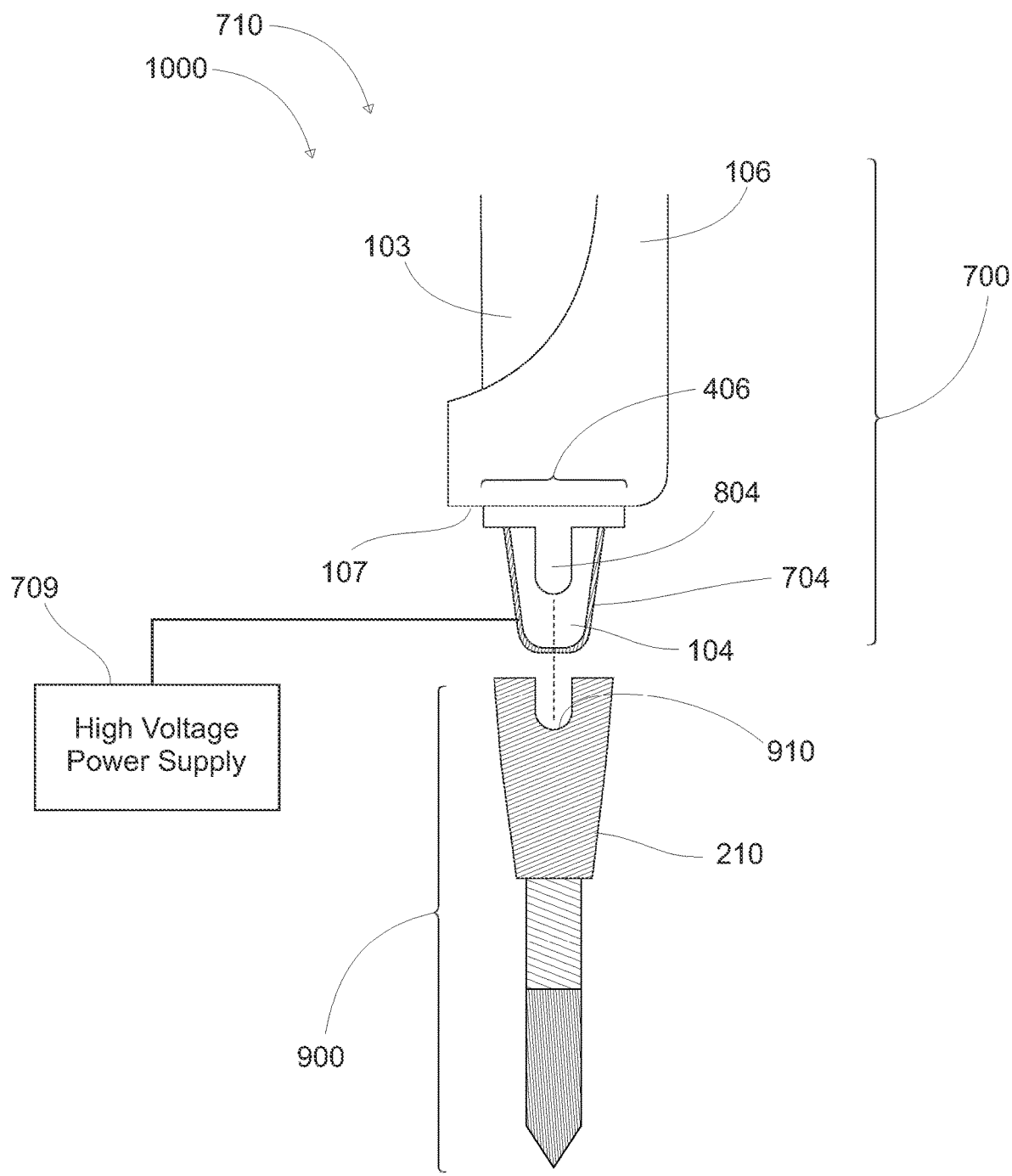
FIG. 10 illustrates the installation of a solid phase microextraction device with two slots into a modified pipettor having equivalent features to orient the solid phase microextraction device to one of two possible positions while installed in the pipettor with the pipettor also being modified to provide electrical communication with a solid phase microextraction device, according to an embodiment of the present disclosure.

Referring to FIG. 10, a magnified detail 710 of a solid phase microextraction device 900 is positioned to be loaded onto a solid phase microextraction device manipulator 1000, and the pipettor shaft 103 and emplacement 104 include protrusions 804 as the clocking feature interface 406 for engagement with the two slots 910 as the clocking feature 305. The protrusions 804 and slots 910 operate as a keyed mechanism to limit the position of solid phase microextraction device 900 in either a 0° or 180° position with respect to solid phase microextraction device manipulator 700. The two-slot design depicted here is for illustrative purposes and is not intended to be limiting. Other configurations employing more or fewer slots 910 may be used, or other features on the receptacle mount 210 may be conceived where the radial rotation of the solid phase microextraction device 900 is restricted while engaged with the solid phase microextraction device manipulator 700, or the slots 910 could be disposed in the solid phase microextraction device manipulator 1000 and the protrusions 804 could extend from the solid phase microextraction device 900 instead, or there could be slots 910 and protrusions 804 for both the solid phase microextraction device 900 and the solid phase microextraction device manipulator 1000.

Figure 11:
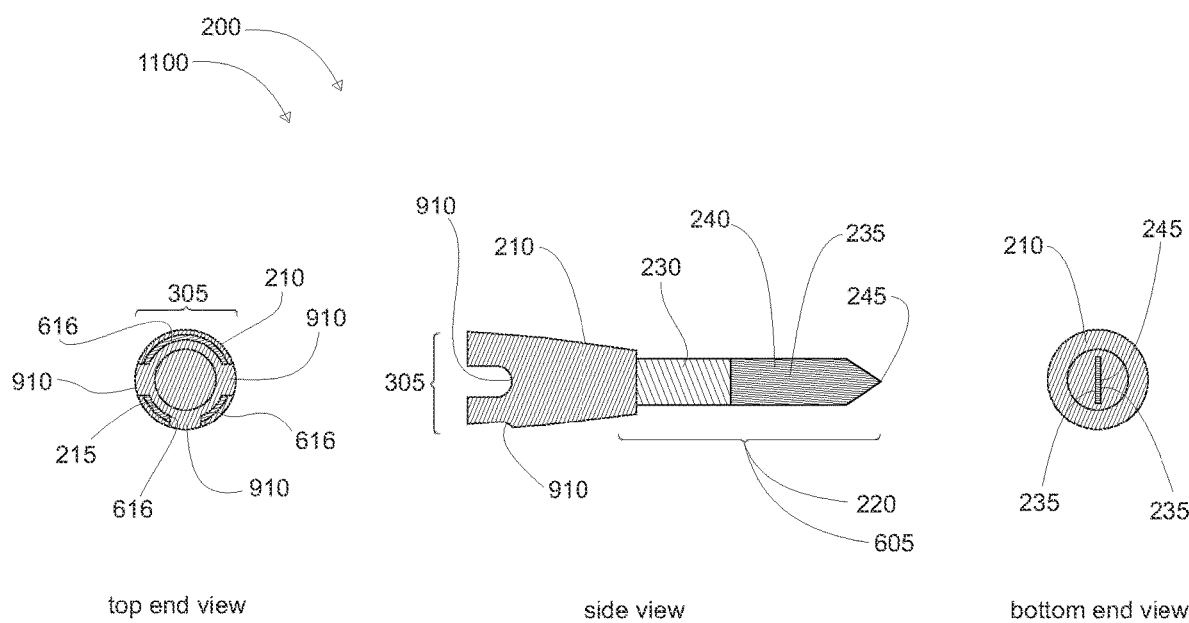
FIG. 11 illustrates a solid phase microextraction device having micropipettor connection elements with three slots and an integrated electrode, the three slots positioned asymmetrically around the connection element to control of the radial orientation of a solid phase microextraction device to one position, according to an embodiment of the present disclosure.
Figure 12:
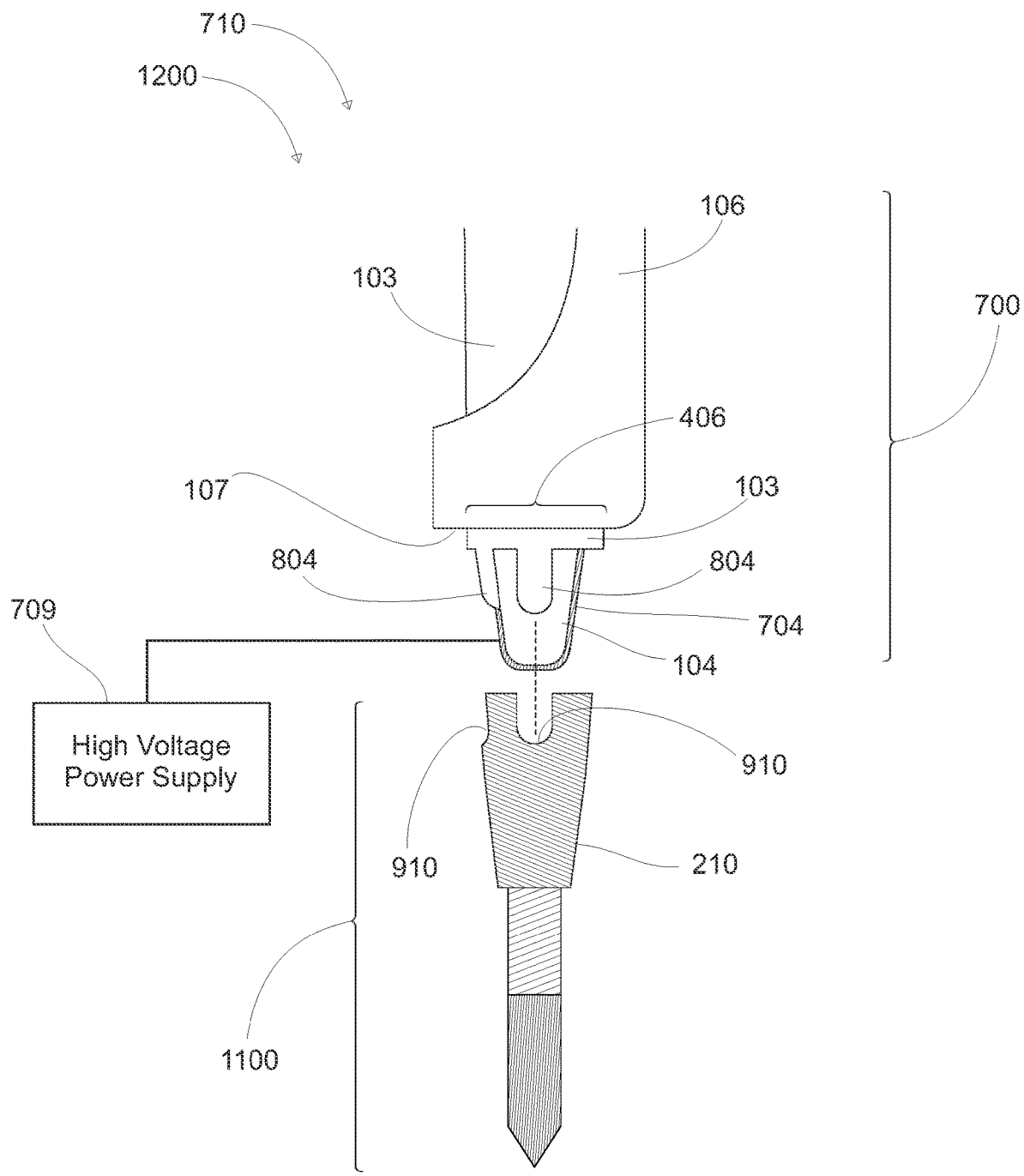
FIG. 12 illustrates the installation of a solid phase microextraction device with three slots into a modified pipettor having equivalent features to orient the solid phase microextraction device to one possible position while installed in the pipettor, the pipettor also being modified to provide electrical communication with a solid phase microextraction device, according to an embodiment of the present disclosure.

Referring to FIGS. 11 and 12, in one embodiment, a solid phase microextraction device 1100 has three slots 910 in an asymmetrical arrangement with respect to the radial center of the receptacle mount 210. This arrangement limits the radial positioning of the blade portion 220. The pipettor shaft 103 and emplacement 104 have protrusions 804 as the clocking feature interface 406 to engage with the three slots 910 of solid phase microextraction device 1100 as the clocking feature 305 allowing for a single radial orientation of the blade portion 220.

Figure 13A:
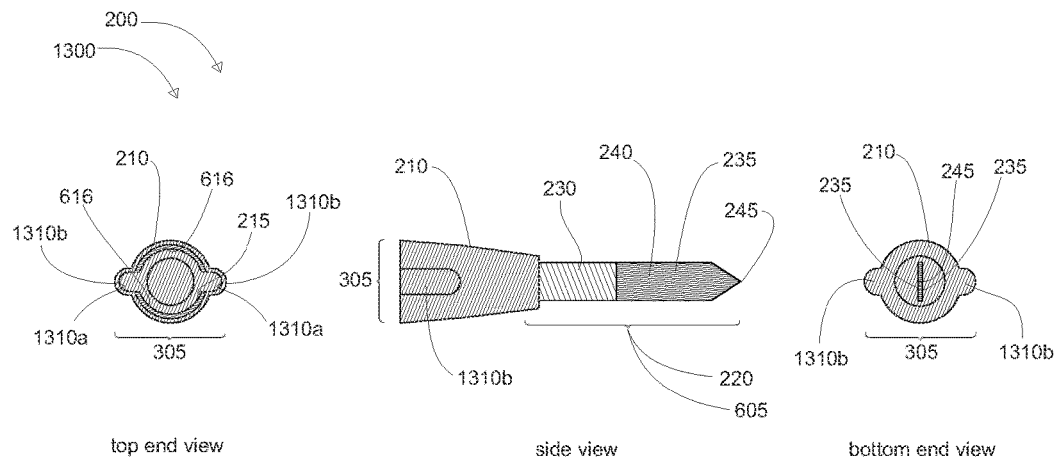
FIG. 13(a) illustrates a solid phase microextraction device having micropipettor connection elements with two hollow protrusions positioned around the connection element to control of the radial orientation of a solid phase microextraction device to one of two possible positions, according to an embodiment of the present disclosure.
Figure 13B:
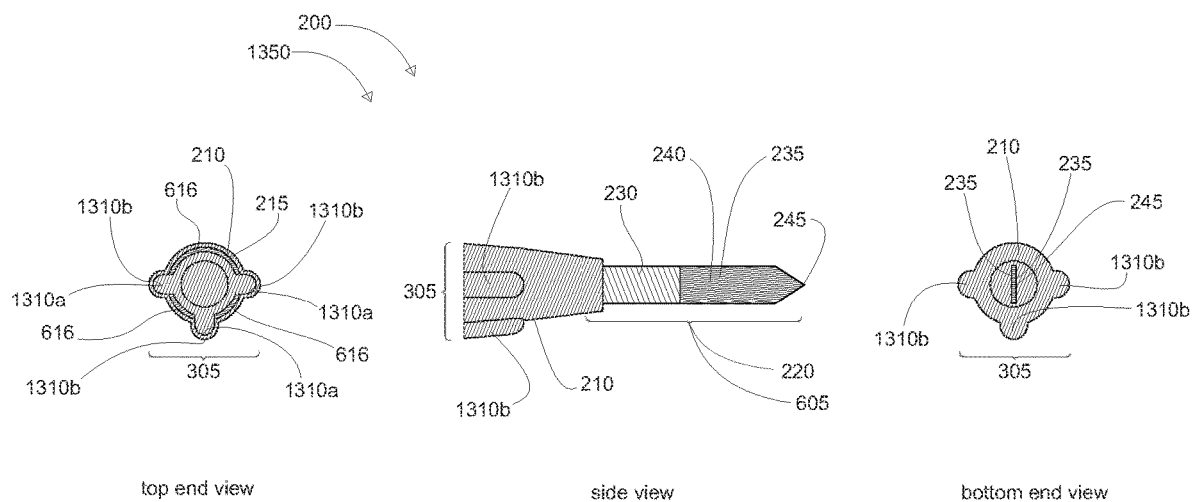
FIG. 13(b) illustrates a solid phase microextraction device having micropipettor connection elements with three hollow protrusions positioned asymmetrically around the connection element to control of the radial orientation of a solid phase microextraction device to one position, according to an embodiment of the present disclosure.

Referring to FIG. 13(*a*), in one embodiment, a solid phase microextraction device 1300 is set at a predetermined radial orientation of the blade portion 220 with two hollow protrusions having an inner surface 1310*a* and an outer surface 1310*b* as the clocking feature 305. The radial position of the hollow protrusions 1310*a* and 1310*b* correspond to protrusions 804 as the clocking feature interface 406. In this fashion the solid phase microextraction device 1300 performs dual functions: (1) the inner surface 1310*a* is configured for receiving the protrusions 804; and (2) the tapered shape of the outer surface 1310*b* is configured for guidance of the solid phase microextraction device 1300 into a solid phase microextraction device repository 400 having a slot 410 consistent with the shape and radial arrangement of the solid phase microextraction device 1300. Electrically conductive terminal 616 on the inner surface 215 of the receptacle mount 210 may provide electrical communication between the solid phase microextraction device manipulator 700 and the blade portion 220. Referring to FIG. 13(*b*), in another embodiment, incorporation of three hollow protrusions having an inner surface 1310*a* and an outer surface 1310*b* fixes the radial position of the solid phase microextraction device 1350 to a single position with respect to the solid phase microextraction device manipulator 700.

While the foregoing specification illustrates and describes exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A solid phase microextraction system, comprising:
  a solid phase microextraction device repository, including:
    a repository wall surrounding and defining a chamber;
    a plurality of orifices disposed in the repository wall; and
    a plurality of repository clocking feature interfaces disposed in the repository wall;
  a solid phase microextraction device, including:
    a substrate having at least one surface;
    a sorbent layer disposed on at least a portion of the at least one surface;
    a microextraction device tip extending from the substrate;
    a receptacle mount disposed distal across the substrate from the microextraction device tip; and
    a device clocking feature; and
  a solid phase microextraction device manipulator, including:
    a manipulator shaft;
    an emplacement disposed at an end of the manipulator shaft;
    an ejector; and
    a manipulator clocking feature interface,
  wherein:
    each of the plurality of orifices disposed in the repository wall is configured to receive and retain the substrate and the receptacle mount of the solid phase microextraction device;
    each of the plurality of clocking feature interfaces disposed in the repository wall is configured to guide the clocking feature of the solid phase microextraction device such that the at least one surface is fixed in one of a predetermined number of radial positions when the solid phase microextraction device is disposed in the solid phase microextraction device repository;
    the chamber is configured to accept the substrate of the solid phase microextraction device with the substrate and the microextraction device tip extending from the substrate being remote from contact with the repository wall or any adjacent solid phase microextraction devices disposed in the solid phase microextraction device repository;
    the receptacle mount of the solid phase microextraction device is configured for removable attachment to the emplacement of the solid phase microextraction device manipulator;
    the manipulator clocking feature interface is configured to guide the clocking feature of the solid phase microextraction device such that the at least one surface is fixed in one of the predetermined number of radial positions when the solid phase microextraction device is mounted on the solid phase microextraction device manipulator;
    the emplacement is configured to removably engage the receptacle mount; and the ejector is configured to dismount the receptacle mount from the emplacement.

2. The solid phase microextraction system of claim 1, wherein the receptacle mount is a pipette tip receptacle mount, the emplacement is a pipettor tip emplacement, and the solid phase microextraction device manipulator is a pipettor.

3. The solid phase microextraction device system of claim 2, wherein the ejector is an ejector shaft.

4. The solid phase microextraction device system of claim 2, wherein the ejector includes an electrically insulating material.

5. The solid phase microextraction device system of claim 2, wherein the receptacle mount includes an electrically conductive terminal, the solid phase microextraction device manipulator includes an electrically conductive contact disposed at the emplacement, and the electrically conductive contact is a conductive layer applied to an outer surface of the pipettor tip emplacement, such that when the receptacle mount is mounted to the emplacement, the electrically conductive contact is in electrical communication with the electrically conductive terminal of the receptacle mount.

6. The solid phase microextraction device system of claim 2, wherein an arrangement of the manipulator clocking feature interface limits a positioning of the solid phase microextraction device to only a single radial position while mounted on the emplacement as the predetermined radial position.

7. The solid phase microextraction device system of claim 2, wherein solid phase microextraction device manipulator is robotic.

8. A solid phase microextraction device repository, comprising:
a repository wall surrounding and defining a chamber;
a plurality of orifices disposed in the repository wall, each configured to receive and retain a substrate and a receptacle mount of a solid phase microextraction device; and
a plurality of repository clocking feature interfaces disposed in the repository wall, each configured to guide a device clocking feature of the solid phase microextraction device into a predetermined radial position and fix the solid phase microextraction device in the predetermined radial position,
wherein the chamber is configured to accept the substrate of the solid phase microextraction device with the substrate and a microextraction device tip extending from the substrate being remote from contact with the repository wall or any adjacent solid phase microextraction devices disposed in the solid phase microextraction device repository, and
wherein the plurality of repository clocking feature interfaces include tapered guides surrounding the plurality of orifices arranged such that if the solid phase microextraction device is inserted into one of the plurality of orifices in a misaligned radial position, inserting the solid phase microextraction device along the tapered guides will realign the solid phase microextraction device into the predetermined radial position.

9. The solid phase microextraction device repository of claim 8, wherein the plurality of orifices is arranged in a one-dimensional array.

10. The solid phase microextraction device repository of claim 8, wherein the plurality of orifices is arranged in a two-dimensional array.

11. The solid phase microextraction device repository of claim 8, wherein each of the plurality of repository clocking feature interfaces includes at least one of an indentation or a protrusion corresponding to at least one of a complimentary protrusion or complimentary indentation of the device clocking feature, such that when the solid phase microextraction device is inserted into the solid phase microextraction device repository, at least one of the plurality of repository clocking feature interfaces limits a radial orientation of the solid phase microextraction device to the predetermined radial position.

12. The solid phase microextraction device repository of claim 11, wherein each of the plurality of repository clocking feature interfaces includes at least two slits as the at least one of the indentation or the protrusion.

13. The solid phase microextraction device repository of claim 12, wherein the at least two slits are asymmetrically arranged so as to limit a positioning of the solid phase microextraction device to only a single radial position as the predetermined radial position while engaged with the solid phase microextraction device repository.

14. A solid phase microextraction device, comprising:
a substrate having at least one surface;
a sorbent layer disposed on at least a portion of the at least one surface;
a microextraction device tip extending from the substrate;
a receptacle mount configured for removable attachment to an emplacement of a receiving device, the receptacle mount being disposed distal across the substrate from the microextraction device tip; and
a device clocking feature configured for fixing a radial orientation of the at least one surface with respect to the receiving device to a predetermined number of radial positions.

15. The solid phase microextraction device of claim 14, wherein the device clocking feature includes at least one of an indentation or a protrusion corresponding to at least one of a complimentary protrusion or complimentary indentation of the receiving device, such that when the solid phase microextraction device is mounted to the receiving device, the device clocking feature limits the radial orientation of the solid phase microextraction device to the predetermined number of radial positions.

16. The solid phase microextraction device of claim 14, wherein the predetermined number of radial positions consists of a single radial position.

17. The solid phase microextraction device of claim 14, wherein the predetermined number of radial positions includes two distinct radial positions.

18. The solid phase microextraction device of claim 14, wherein the solid phase microextraction device includes visual indicia of a radial orientation of the at least one surface on the receptacle mount.

19. The solid phase microextraction device of claim 14, wherein the solid phase microextraction device is a coated blade spray device.

20. The solid phase microextraction device of claim 14, wherein the receptacle mount is a pipette tip receptacle mount and the emplacement is a pipettor tip emplacement.

* * * * *